3,065,258
METHOD OF STABILIZING ALCOHOLS WITH ALKALI METAL ALUMINUM HYDRIDES
William A. Dinzler, Jr., and Seymour Stahl, Colonia, N.J., assignors to Esso Research and Engineering Company, a corporation of Delaware
No Drawing. Filed July 23, 1959, Ser. No. 828,961
4 Claims. (Cl. 260—475)

This invention relates to stabilized alcohols and a method of treating impure alcohols for the purpose of improving their color properties. More specifically, this invention is directed to a method of treating synthetic alcohols with aluminum-containing hydrides for the purpose of improving their color properties and the color properties of their related products. This invention relates especially to the treatment of oxo alcohols with aluminum-containing hydrides and a mutual solvent to improve the color properties of their esters.

The ever expanding use of plastic materials, such as vinyl chloride polymers and copolymers, polyvinyl acetate, cellulose esters, acrylate and methacrylate resins, rubbers such as the emulsion copolymers of butadiene and styrene or acrylonitrile, or the copolymers of isobutylene with small amounts of a diolefin such as isoprene, has created a large demand for suitable plasticizers. Branched chain alkyl organic esters and particularly alkyl phthalic acid esters and more particularly octyl and decyl phthalate, as well as the esters of $C_4$ to $C_{10}$ dibasic acids such as maleic acid, adipic acid, azelaic acid, sebacic acid or their anhydrides, are extremely satisfactory plasticizers for the aforementioned high molecular weight materials. For the esterification reaction, acid-reacting organic compounds having two acid radicals, such as dicarboxylic acids and/or their anhydrides, are suitable.

These plasticizer esters are generally prepared by the esterification of a suitable alcohol, e.g. $C_6$ to $C_{16}$ alcohol, with an acidic reactant such as phthalic acid, the anhydride thereof or any of the acidic reactants noted above. In general, the alcohol is employed in amounts from stoichiometric to substantial excesses and heated, preferably in the presence of an acid catalyst such as benzene sulfonic acid, toluene sulfonic acid, naphthalene sulfonic acid or the like. Entrainers or azeotrope formers may be employed during the reaction to effect the removal of water at lower temperatures since it is known that severe operating conditions, including high temperatures and strongly acidic catalysts, tend to magnify any discoloration which may result from contaminants in the alcohol reactant. Entrainers usually employed are the low boiling aromatics such as benzene, toluene, xylene and the like, paraffinic hydrocarbons of suitable boiling points, e.g. heptane and octane or olefinic materials such as diisobutylene, etc. Various processes applicable to the manufacture of these plasticizer esters are known and this invention does not depend on an specific one. Also numerous acid and alcohol reactants are known and are amply set forth in the abundant prior art.

One of the primary difficulties encountered in the manufacture of plasticizer esters, especially where $C_8$ and $C_{10}$ alcohols are employed, is the failure to obtain colorless products even when relatively high purity reactants are employed. It has been known for some time that sulfur contaminants result in off-color ester products and more recently it was discovered that carbonyl compounds, carbonyl-forming compounds such as acetals and various unsaturated compounds such as olefins affect to a marked degree the color of the final ester product. To counteract the degradation of color resulting from these color-forming contaminants, many commercial esterification process employing mild conditions and carefully control the reaction medium. Thus mild p-toluene sulfonic acid is often employed in lieu of sulfuric acid and the reaction mixture is kept free of oxygen usually by blanketing the system with $CO_2$ or other inert gases. Sulfonic acids, such as p-toluene sulfonic acid, are considerably more expensive than sulfuric acid and, furthermore, more sulfonic acid is necessary due to its lower order of activity. Therefore it would be a considerable advance in the art and a substantial savings in manufacturing cost if sulfuric acid could be employed with alcohols contaminated as described above any if the esterification reaction could be run open to the atmosphere and still obtain higher color quality products.

Even when the mild p-toluene sulfonic acid catalysis and the use of inert atmosphere are employed, the resulting plasticizer ester is often discolored to a serious degree. Insofar as the plasticizer industry is concerned, the color of the plasticizer product is one of the most important quality factors involved in the selection of the alcohol intermediate to be used in the esterification process. Water-white plasticizers represent the epitome of plasticizer color quality and the quality rating becomes lower as the product becomes deeper in color.

At present a principal source of alcohols for the manufacture of plasticizer esters is via the oxo or carbonylation route where an olefin is reacted with carbon monoxide and hydrogen in the presence of a catalyst, generally a cobalt salt, at elevated temperatures and pressures to form an aldehyde product having one more carbon atom than the starting olefin. This aldehyde product is then freed of cobalt and subsequently hydrogenated to form the corresponding alcohol product. While the sulfur contaminants introduced into the product by either the olefin or the hydrogenation catalyst, etc., may be cleaned up effectively by caustic washing, extensive distillation and similar treatments, the final alcohol product obtained in general will contain sufficient amounts of carbonyl compounds such as acetals, aldehydes, etc., and unsaturated compounds, to seriously affect the ultimate color qualities of any ester prepared therefrom. The term "carbonyl compound" is employed herein to mean those compounds containing an aldehyde radical and those compounds which readily form aldehydic compounds. Oxo alcohols will generally contain from 0.01 to 1.0 wt. percent or higher or carbonyl compounds. Dimer alcohols prepared by a modified oxo route are also valuable as intermediates in the preparation of esters and are subject to the same contamination problems as the ordinary oxo-alcohols. Oxo octyl alcohol, or as it called "isooctyl alcohol," comprises major amounts of dimethyl-1-hexanol and minor amounts of methyl-1-heptanol and smaller amounts of miscellaneous branched alcohols. Oxo decyl alcohol varies in isomeric composition; however it comprises predominantly trimethyl heptanols.

One potential commercial source of alcohols suitable for the preparation of plasticizers is via the alkyl metal route. This relatively new process comprises basically the addition of ethylene or other olefin onto a metal alkyl, such as aluminum triethyl or aluminum triisobutyl, to prepare high molecular weight aluminum trialkyl compounds which in turn may be oxidized to form the corresponding aluminum alcoholates and finally hydrolyzed to form the alcohol. The alcohols obtained via this new route also contain substantial quantities of carbonyl compounds which are either not separable from the alcohol or separable only with extensive costly treatment. Alternatively the alkyl metal may be made directly by reaction of olefin with metal and hydrogen. An alkyl metal of this type is easily converted to alcohols in the manner described above. This invention is amenable to the use of alcohols having the aforementioned contaminants regardless of how the alcohols are prepared.

It is an object of this invention to treat the contaminated alcohols in a manner which will permit the preparation of plasticizer esters having improved color properties.

It is known from the prior art that the color properties of oxo alcohols can be improved by hydrogenation. Wise, U.S. Patent 2,867,651 teaches that alcohols possessing poor color properties can be treated with metal borohydrides to improve their color properties. This sort of treatment is economically more feasible than conventional hydrogenation (hydrofining). It now has been discovered that by employing certain mutual solvents, aluminum-containing hydrides will effectively inhibit discoloration of the plasticizer ester whether it is prepared by the severe conditions of sulfuric acid catalysis in the presence of air or under the mild conditions of sulfonic acid catalysis under an inert atmosphere.

The color degradation inhibitors of this invention, which comprise the alkali metal and alkaline earth metal aluminum hydrides, are admixed with an ether solvent which has a capacity to dissolve at least a portion of the hydride and the resulting mixture is used to treat alcohols contaminated with color-forming bodies. The alcohols may be treated seperately or in a mixture of said alcohols and the acidic substances used to esterify them. While the treating conditions are not critical for economic reasons it is preferable to admix the alcohol with a dilute solution of the inhibitor at ambient temperature and pressure. Of course, it is sometimes more desirable to use higher and lower temperatures, e.g. 0–50° C., and pressures, e.g. 5–50 p.s.i.a. and these conditions should be employed in those cases.

While metal aluminum hydrides, such as potassium aluminum hydride and calcium aluminum hydride, are suitable for the purposes of the present invention, lithium aluminum hydride and sodium aluminum hydride are preferred. The amount of hydride used should be minor in relationship to the alcohol. For example, small or even trace amounts, such as 0.0001 to 0.2 wt. percent based on the alcohol, of the hydride are highly effective in reducing or eliminating the color-forming bodies in the alcohol product.

The mutual solvent is of particular importance since the use of solid metal aluminum hydride with no solvent results in little or no improvement in ester color. It has been found that there is a synergistic effect between the aluminum-containing hydrides and the particular ether employed. The magnitude of this effect is dependent upon both the nature of the aluminum-containing hydride and the solvent. Some of the lower molecular weight cyclic and acyclic ethers which may be used are tetrahydrofuran, diethylether and dioxane. While stable saturated ethers having up to 10 carbon atoms may be employed, the best solvents are the $C_3$ to $C_6$ ethers, and of the latter the $C_4$ ethers are especially preferred. In any case, the ether should be essentially anhydrous and unreactive towards the hydride. The hydride is generally first dissolved in the solvent at about ambient temperature and pressure and then added to the alcohol. The concentration of hydride solution is dependent mainly on the solubility of the compound in the particular solvent. To be specific, concentrations of about 0.25 to 5% are suitable for most alcohol treatments.

The effect of aluminum-containing hydrides as color inhibitors is marked regardless of the esterification conditions employed. For example, an improvement in plasticizer color will be obtained with toluene sulfonic acid catalysis as well as with sulfuric acid catalysis.

The esterification reaction may be carried out by contacting about 2 to 4.0 moles of the alcohol with one mole the desired dicarboxylic acid or anhydride under thermal conditions comprising 125 to 250° C. and preferably 160 to 225° C. for a period of at least about ½ hour. Reaction time may be as high as 8–10 hours in some cases. Atmospheric to slightly elevated pressures may be employed, if desired. Also, the reaction mixture may be blanketed under slight pressures by carbon dioxide, nitrogen or other inert gases to exclude oxygen. Acid catalysis may be employed, if desired, however, when carrying out such a reaction the temperatures will preferably be of a much lower order, e.g. 100 to 200° C. and preferably between 130 to 160° C. The amount of acid catalyst employed may vary in accordance with its activity. For example, as little as 0.05 wt. percent on alcohol, if sulfuric acid is the catalyst, while as much as 7.0 wt. percent of toluene sulfonic acid, may be employed. Benzene, toluene or the like is generally employed to remove water as it is formed in an amount of 5 to 50 wt. percent based on alcohol.

The improvement in color properties of the esters does not appear to depend upon the presence of the aluminum-containing hydride during the esterification process. In fact, the inhibited alcohol may be allowed to age to such an extent that the excess aluminum-containing hydride is decomposed or alternatively the aluminum-containing hydride may be removed in some manner without affecting the improved color properties of the alcohol or its ester.

The mutal solvent used may be removed from the inhibited alcohol by any of a number of conventional methods, e.g. distillation. Since there is usually only a small amount of solvent present in the alcohol, it is not normally removed.

In a few cases, a precipitate is formed after the addition of the solubilized aluminum-containing hydride. This can be removed by a number of conventional means; e.g. filtration or gravity separation.

To demonstrate the effect of the solubilized aluminum-containing hydride, the following examples are included.

EXAMPLE 1

Lithium aluminum hydride (10 grams) is dissolved in anhydrous diethyl ether (250 ml.) by refluxing at 37° C. under a dry nitrogen atmosphere. One ml. of this solution (ca. 0.012 wt. percent hydride based on the alcohol) is added to decyl alcohol (335 grams) at room temperature and stirred for 20 minutes. This corresponds to about 120 parts per million based on the alcohol. The alcohol (2.1 moles) is then esterified with 1 mole of phthalic anhydride in the presence of 75 ml. of toluene and 0.32 wt. percent of 98% sulfuric acid (based on the theoretical amount of ester) by heating the mixture to about 160° C. for about 1½ hours. The water formed is removed as an azeotrope with the toluene. A control alcohol sample is esterified in the same manner. The color of the control ester is 100 Hazen while the color of the ester made with the treated alcohol is only 20 Hazen.

EXAMPLE 2

The procedure outlined in Example 1 is repeated employing sodium aluminum hydride in anhydrous diethyl ether in place of lithium aluminum hydride. A marked improvement in the color properties of the ester is again noted.

EXAMPLE 3

The procedure outlined in Example 1 is repeated employing anhydrous tetrahydrofuran in place of diethyl ether as the solvent. A marked improvement in the color properties of the ester is noted.

EXAMPLE 4

Lithium aluminum hydride (0.1 gram) is dissolved in 7 mls. of anhydrous diethyl ether and added to 300 grams of decyl alcohol prepared by the oxo process. The oxo alcohol is then esterified with phthalic anhydride in the manner described in Example 1. This ester and a control ester were analyzed in a Bauch & Lomb colorimeter (33–29–40) at a wave length of 447 m$\mu$. At this wave length the control ester had an absorption of 0.67 while the ester made from the treated alcohol had an absorption value of 0.290. In terms of visual color, the control ester had a brown color while the other ester had a light yellow color. This is an outstanding improvement since the oxo alcohol contained about 0.4 wt. percent carbonyls.

It is not intended to indicate that alcohols containing azo dyes and the like can be improved by this invention insofar as their color properties are concerned. The purpose of this invention is to improve the color properties of alcohols wherein the color-forming substances occur as a result of the method employed in producing such alcohols and not wherein such color-forming substances were added to said alcohols.

While this invention has been described with particular reference to alcohols such as those obtained by the oxo process, it will be appreciated that other alcohols containing similar impurities may be purified in accord with this invention. Modifications and additional applications of this invention will be obvious to one skilled in the art. It is our intention that this invention not be limited by any of the terms of the description unless otherwise specified, but rather to be construed broadly within the spirit and scope as set out in the accompanying claims.

What is claimed is:

1. In the process of making plasticizer esters from phthalic acid and a $C_6$ to $C_{16}$ oxo alcohol, the improvement which comprises contacting the alcohol prior to the esterification with about 0.0001 to 0.2 wt. percent of an alkali metal aluminum hydride, based on said alcohol, dissolved in a $C_3$ to $C_{10}$ saturated ether.

2. A method of treating a $C_6$ to $C_{16}$ oxo alcohol containing color-forming carbonyl contaminants which comprises contacting said alcohol with about 0.0001 to 0.2 wt. percent of an alkali metal aluminum hydride, based on said alcohol, dissolved in a $C_3$ to $C_6$ saturated ether.

3. A method of treating an alkanol having 6 to 16 carbon atoms per molecule and contaminated with carbonyl compounds which comprises contacting said alkanol with about 0.0001 to 0.2 wt. percent of a alkali metal aluminum hydride, based on said alkanol, dissolved in a $C_3$ to $C_{10}$ saturated ether.

4. A method of treating oxo decyl alcohol contaminated with carbonyl compounds which comprises contacting said alcohol with about 0.0001 to 0.2 wt. percent of lithium aluminum hydride, based on said alcohol, dissolved in anhydrous diethyl ether, at ambient temperature and pressure.

References Cited in the file of this patent

UNITED STATES PATENTS

| | | |
|---|---|---|
| 2,780,643 | Buehner | Feb. 5, 1957 |
| 2,867,651 | Wise | Jan. 6, 1959 |
| 2,957,023 | Dimler et al. | Oct. 18, 1960 |

OTHER REFERENCES

Hackh's Chemical Dictionary, publ. by the Blakiston Co. (Phila.), page 607 (1944).

Schmidt et al.: "Chemische Berichte," vol. 91, No. 3, pages 506–515, (1958).